April 7, 1953  G. VON ALLMEN  2,634,074

CONTAINER LID LIFTER

Filed April 21, 1949

INVENTOR.
GODFREY VON ALLMEN
BY
Joseph A. Rave
Attorney

Patented Apr. 7, 1953

2,634,074

UNITED STATES PATENT OFFICE 2,634,074

CONTAINER LID LIFTER

Godfrey Von Allmen, Louisville, Ky.

Application April 21, 1949, Serial No. 88,776

3 Claims. (Cl. 248—147)

This invention relates to a container lid lifter and particularly to such a device wherein the lid or cover is placed on and lifted or removed directly from the container.

In the past there has been provided covered receptacles in which use is made of a lid or cover hingedly mounted on the receptacle for operation to permit the insertion and removal from the receptacle of a container and in which the said lid or cover is actuated about its hinge connection by a foot treadle or the like. In said prior structures the container itself is provided with no lid or cover depending for its covering being obtained from the receptacle lid or cover. The present invention contemplates the use of a container having a completely removable lid or cover in which the said lid or cover is separably interengaged for actuation from the container when access thereto is desired. The said lid or cover being actuated from its closing position by means that are manually operated from a treadle preferably by the user's foot.

It is therefore the principal object of the present invention to provide a device for removing and subsequently applying a cover, lid, or the like, directly to and from a container.

Another object of this invention is the provision of a device that will accomplish the foregoing object and in which the said lid or cover is detachably connected thereto so that the said lid, cover, or the like, may be detached from the lifting device and placed on the container when the container is separated from the device.

A further object of this invention is the provision of a device for accomplishing the foregoing objects in which the lid, cover, or the like, lifting mechanism is operated from a foot treadle thereby permitting the operator to have his hand free for other uses.

A still further object of the present invention is the provision of a structure for accomplishing the foregoing objects that is economical to produce and simple to operate yet highly efficient.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings:

Fig. 1 is a side elevational view of the container lid lifting device embodying the principles of the present invention.

Fig. 2 is a front elevational view of the device of Fig. 1.

Fig. 3 is a top plan view of the device of Figs. 1 and 2 illustrating the same without the container associated therewith.

Fig. 4 is a horizontal sectional view through the device of the present invention as seen from line 4—4 on Fig. 1 with the container of Fig. 1 being omitted.

Fig. 5 is a fragmentary vertical sectional view taken on line 5—5 on Fig. 2.

Fig. 6 is a fragmentary vertical sectional view taken on line 6—6 on Fig. 2.

Fig. 7 is an enlarged fragmentary sectional view taken on line 7—7 on Fig. 2.

Fig. 8 is an enlarged fragmentary sectional view taken on line 8—8 on Fig. 1.

Throughout the several views of the drawings similar reference characters are employed to denote the same or similar parts.

The device of the present invention will find its principal use in commercial establishments and the like in which there is utilized a container of considerable capacity for the reception of garbage, refuse and other waste material that is generally discharged from a dish or other support, such as in restaurants, taverns, doctors' offices, and the like, and wherein the said container for sanitary reasons and comfort of the occupants of the premises must be covered between uses. In these cases the containers are generally set out for disposal or emptying into other and larger containers, but which initial containers must have their cover or lid thereon while being transported between the place of filling and disposal. At the place of use the user generally has each hand occupied thereby requiring the user to free one or the other of his hands in order to remove the cover or lid to gain access to the container and after use to manually retrieve the cover or lid and apply same to the container. As noted above this invention contemplates a device for lifting such a cover or lid by a foot treadle so that the operator or user can readily gain access to the container while his hands are otherwise occupied and without freeing the same.

Specifically, the device of the present invention includes a base portion 11, an upstanding portion 12 and the lid or cover lifting mechanism 13. The base portion 11 is formed of a pair of side rails 14 and 15 each conveniently formed as an angle iron with their front ends joined by a front or tie rail 16 likewise conveniently in the form of an angle iron. Any suitable or desirable means may be employed for securing the side rails 14 and 15 and tie rail 16 to one another such as bolts, rivets, welding, or the like, passing through or associated with the overlapped portions of the legs 14', 15' and 16' respectively of said rails 14, 15 and 16 which occurs at the outer front corners of the base portion 14. Intermediate the ends of the side rails 14 and 15, preferably nearer the rear ends thereof, they are secured to one another in spaced apart relation by a container support or tie bar 17 which is a flat strip, clearly illustrated in Figs. 3 and 4, and disposed upon the inwardly projecting legs 14' and 15' of the side rails 14 and 15. The said container support or tie bar being secured by any suitable or desirable means extending therethrough and through the portion of the said side rails legs 14' and 15' on which it rests.

The upright portion 12 comprises upstanding corner posts 18 and 19, each in the form of an angle iron which have their lower ends closely adjacent the rear ends of the side rails 14 and 15 and disposed on the horizontal legs 14' and 15' thereof, and with the legs 18' and 19' of said posts 18 and 19 in face contact with the vertical legs 14" and 15" of the base side rails 14 and 15. The upper ends of the corner posts 18 and 19 are secured in spaced apart relation by a top spacer member 20 again conveniently in the form of an angle iron, having the vertical leg 20' thereof in face contact with the corner posts legs 18" and 19" that project toward one another and with said parts again secured in any suitable or desirable manner as by bolts, rivets, welding, or the like. Intermediate the height of the corner posts 18 and 19, and preferably nearer the lower ends thereof, they are joined by a cross brace, illustrated as in the form of an angle iron 21, which has the vertically disposed leg 21' in face contact with the corner posts legs 18" and 19" that project toward one another, which brace has its horizontal leg 21" projecting toward the front of the device for a purpose subsequently to be made clear.

The base 11 and upright 12 are braced in their right-angular positions by angularly disposed side members or braces 22 and 23, again, conveniently in the form of angle irons. Said braces 22 and 23 have their vertically disposed legs 22' and 23' in face contact with the base side rails vertically disposed legs 14" and 15" and with said parts secured to one another in any suitable or desirable manner. The upper ends of said sides or braces 22 and 23 are connected with the upright corner posts at their upper ends by means of pivot bolts 24 and 25 which pass through the said side member or braces legs 22' and 23' as well as through the corner posts legs 18' and 19' with said pivot bolts 24 and 25 additionally employed for pivotly supporting the lid or cover lifting mechanism 13.

The lid or cover lifting mechanism 13, as seen in Fig. 3, is substantially U-shaped and comprises outwardly projecting arms 26 and 27 secured in spaced apart relation by the front cross member 28. Each of the arms 26 and 27 and the cross member 28 is in the form of an angle iron and are secured to one another by having the ends of the cross member leg 28' in face contact with the arms legs 26' and 27' and secured to one another in any suitable or desirable manner such as by bolts, rivets, welding, or the like.

Substantially mid-way of the lid lifter cross member 28 is a hook-like member 29' comprising a body portion 29 in face contact with the vertical leg 28" of the lid lifter cross member 28 and with said hook-like member having an outwardly disposed curved finger 30 which is adapted to be inserted within the handle 31 of the container lid 32.

The lid lifter mechanism 13 has its arms 26 and 27 disposed intermediate the upper ends of the side members or braces 22 and 23 and the adjacent corner posts 18 and 19 and has passing therethrough the pivot bolts 24 and 25. Suitable spacers 52 and 53 are mounted on each pivot bolt on the opposite sides of the lifter mechanism arms 26 and 27 so as to space said arms respectively from its side members or brace 22 and 23 and its corner post 18 and 19.

The container lid handle 31 is of the usual construction and as seen in Fig. 2 is substantially U-shaped comprising a base portion 33 from the ends of which depend arms 34 and 35 which ends are secured to the upper outer surface of the container lid 32.

The attachment of the lid 32 to the lifting mechanism 13 is a simple operation and readily accomplished requiring merely the insertion of the curved finger 30 of the hook-like member 29' to be inserted beneath the container lid handle base 33. In operation, the oscillation of the lid lifting mechanism 13 about the pivot bolts 24 and 25 upwardly raises the cross member 28 and which through its hook-like member 29' correspondingly actuates the container cover or lid 32. In order to permit the lid or cover lifting mechanism 13 to be actuated about its pivot, the arms 26 and 27 each have their horizontal legs 26' and 27' removed for a distance inwardly of the rear ends thereof as clearly illustrated in Fig. 3.

The container lid 32, in its closed position, is adapted to rest on the upper edge of the container, indicated in the drawings by the reference numeral 36. It should be noted that the container 36 and its lid 32 are of a standard type obtainable on the market and are generally formed of galvanized iron with the said container having a smooth outer surface or provided longitudinally with corrugations for strengthening purposes. The container 36 is provided with a bail handle 37 for transportation purposes and with a closed bottom 38. The container is adapted to be disposed on the base portion 11 and preferably on the container supporting member or tie bar 17 which forms the main support for the container. The parts are so designed that the container when disposed on the member 17 is in contact with the upright portion cross member 21 and preferably in contact with the forward edge of the horizontal leg 21" of said cross member. With the container in this position it is disposed above the rear edge of the leg 16" of the base portion front rail 16. The vertically disposed legs 14" and 15", of the base portion side rails 14 and 15, and the vertically disposed leg 16', of the base portion front rail, along with the upright cross member 21, form between them a means to prevent the lateral shifting of the container while on the base portion 11.

In operation the lid or cover lifting mechanism is adapted to be actuated to the position shown in phantom lines and indicated by the reference numeral 39, in Fig. 1, which actuates the container lid or cover to the position as illustrated in phantom lines. With the parts in this position it will be seen that the container 36 may be readily removed from the base portion 11 or placed thereon.

In order to actuate the lid lifting mechanism 13 from the solid line to the phantom line position in Fig. 1 use is made of a treadle mechanism comprising side arms 40 and 41 each in the form of an angle iron with their outer ends joined in spaced apart relation by a front member 42 likewise in the form of an angle iron. The treadle side arms 40 and 41 and front member 42 are secured to one another by having the ends of the front member horizontal leg 42' in face contact with the forward ends of the side arms legs 40' and 41' and secured to one another in any suitable or desirable manner as by rivets, bolts, welding, or the like.

The rear ends of the treadle side arms are connected with the upright portion 12 by means of pivot bolts 43 and 44 which pass through the treadle side arms vertical legs 40'' and 41'' and through the corner posts forwardly projecting legs 18' and 19'. The pivot bolts 43 and 44 each have mounted thereon, between the treadle side arms 40 and 41 and their respective corner posts 18 and 19, a spacer 54 which permits easy and ready operation of the treadle on its pivot bolts 43 and 44. Intermediate the ends of the treadle side arms 40 and 41 they are respectively provided with an eye bolt 45 and 46 to each of which is connected one end of a link, which are of similar construction and one of which is clearly illustrated in Fig. 1 and will be described in detail for both links. The said link comprises a reach 47 connected with the eye bolt 45 and a second reach 48 pivotally connected through an aperture 49 with a projecting portion of the lid lifter arm 26, specifically the vertically disposed leg 26'' of said arm 26. The link reaches 47 and 48 have their other ends connected to one another through a turn-buckle 50 which appropriately balances the lengths of the links and properly positions the treadle with respect to the base portion 11 and lid lifting mechanism 13 for the proper operation of said lid lifting mechanism. In order to conveniently actuate the treadle, its front member 42 has secured to it intermediate its ends a foot piece 51.

From the foregoing it will be readily understood that the actuation of the treadle from the solid line position thereof in Fig. 1 to its phantom line position, also in Fig. 1, will, through the links, actuate the lid lifting mechanism 13 from its solid line position to its phantom line position for the purpose above set forth. It will also be noted that the container lid 32 can very readily be removed from the hook finger 30 when the lid lifting mechanism is in the dotted line position so that upon removal of the container 36 from the base portion 11 said lid may be placed on the container for transportation with the container to a point of disposal of the contents of the container. An empty container is then placed on the base portion 11 and its lid removed from the container and attached to the hooklike member 29', by means of its handle 31, for operation toward and from the container 36 in the normal operation of the device, as when it is desired to put garbage, refuse, or the like, into the container and with the hands occupied in placing said garbage, refuse, or the like, in said container.

From the foregoing, it is believed now evident that there has been provided a container lid lifting device which accomplishes the objects initially set forth.

What is claimed is:

1. In a container lid lifting device of the class described the combination of a base portion for supporting a container which has a removable lid, said base portion having a front and a back, corner posts upstanding from the base portion from opposite ends of said back, a top cross brace for said corner posts, a side member between the upper end of each corner post and the corresponding end of the base portion front, a transverse brace member for said corner posts located intermediate the upper and lower ends of said corner posts for positioning the container on the base portion, a lid lifter pivotally mounted on the corner posts at the upper ends thereof for oscillation toward and from the base portion, the container cover having a handle through which it is removed from the container, a hook-like member on the lid lifting mechanism for separable connection with the cover handle whereby said cover is movable with the lid lifting mechanism, and a foot treadle pivotally mounted on the corner posts near the lower ends thereof connectable with the lid lifting mechanism for effecting its oscillation.

2. In a container lid lifting device of the class described the combination of a base portion for supporting a container which has a removable lid, said base portion having a front and a back, corner posts upstanding from the base portion from opposite ends of said back, a top cross brace for said corner posts, a side member between the upper end of each corner post and the corresponding end of the base portion front, a transverse brace member for said corner posts located intermediate the upper and lower end of said corner posts for positioning the container on the base portion, a lid lifter substantially U-shaped in plan including a front bar and rearwardly projecting arms at the ends of said front bar disposed adjacent the corner posts, pivot means connecting said arms to said posts whereby the lid lifting mechanism is oscillatable toward and from the base portion, a foot treadle pivotly mounted on the corner posts for oscillation relative thereto, said lid lifting mechanism arms projecting beyond the corner posts, and a link between the projecting ends of the lid lifter arms and the foot treadle.

3. In a container lid lifting device of the class described the combination of a base portion for supporting a container which has a removable lid, said base portion having a front and a back, corner posts upstanding from the base portion from opposite ends of said back, a top cross brace for said corner posts, a side member between the upper end of each corner post and the corresponding end of the base portion front, a transverse brace member for said corner posts located intermediate the upper and lower ends of said corner posts for positioning the container on the base portion, a lid lifter substantially U-shaped in plan including a front bar and rearwardly projecting arms at the ends of said front bar disposed adjacent the corner posts, pivot means connecting said lid lifter arms to said posts whereby the lid lifter is oscillatable toward and from the base portion, a foot treadle including a treadle front member and rearwardly projecting treadle arms at the ends of the treadle front member, said treadle arms having their rear ends adjacent the corner posts, means pivotly connecting said treadle arm ends and corner posts to one another whereby the foot treadle is oscillatable, the lid lifter arms projecting beyond the corner posts, and a link between each treadle arm and lid lifter arm projection for connecting the treadle and lid lifter for simultaneous oscillation upon actuation of the foot treadle.

GODFREY VON ALLMEN.

REFERENCES CITED

The following references are of record in the file of this patent:

UNITED STATES PATENTS

| Number | Name | Date |
|---|---|---|
| 957,237 | Moorman | May 10, 1910 |
| 1,130,774 | Tierney | Mar. 8, 1915 |
| 1,137,355 | Schell | Apr. 27, 1915 |
| 1,195,566 | Davis | Aug. 22, 1916 |
| 2,182,432 | Hamel | Dec. 5, 1939 |

FOREIGN PATENTS

| Number | Country | Date |
|---|---|---|
| 513,051 | Germany | Nov. 6, 1930 |